(12) United States Patent
Lenhof

(10) Patent No.: US 11,394,233 B2
(45) Date of Patent: Jul. 19, 2022

(54) DEVICE AND METHOD FOR CHARGING A TERMINAL DEVICE

(71) Applicant: Charging Energy Partner GmbH, Munich (DE)

(72) Inventor: Marc Christian Lenhof, Munich (DE)

(73) Assignee: Charging Energy Partner GmbH, Munich (DE)

( * ) Notice: Subject to any disclaimer, the term of this patent is extended or adjusted under 35 U.S.C. 154(b) by 358 days.

(21) Appl. No.: 16/484,211

(22) PCT Filed: Feb. 2, 2018

(86) PCT No.: PCT/EP2018/052633
§ 371 (c)(1),
(2) Date: Aug. 7, 2019

(87) PCT Pub. No.: WO2018/146011
PCT Pub. Date: Aug. 16, 2018

(65) Prior Publication Data
US 2020/0028374 A1 Jan. 23, 2020

(30) Foreign Application Priority Data

Feb. 7, 2017 (DE) .......................... 102017102353.4

(51) Int. Cl.
*H02J 7/34* (2006.01)
*H02J 7/00* (2006.01)
*G06F 1/26* (2006.01)

(52) U.S. Cl.
CPC ................ *H02J 7/342* (2020.01); *G06F 1/26* (2013.01); *H02J 7/00036* (2020.01); *H02J 7/00* (2013.01);
(Continued)

(58) Field of Classification Search
CPC .... H02J 7/342; H02J 7/00036; H02J 7/00034; H02J 7/00045
(Continued)

(56) References Cited

U.S. PATENT DOCUMENTS 7,554,289 B2 * 6/2009 Idzik ....................... H02J 7/342
320/110
8,401,473 B2 * 3/2013 Tang ..................... H04W 99/00
320/149
(Continued)

FOREIGN PATENT DOCUMENTS

DE 10 2010 003 872 A1 10/2010
DE 10 2013 103 144 A1 10/2014
(Continued)

OTHER PUBLICATIONS

Office Action for Korean Application No. 10-2019-7026392, dated Jul. 12, 2021.
(Continued)

*Primary Examiner* — Richard V Muralidar
(74) *Attorney, Agent, or Firm* — Marshall, Gerstein & Borun LLP

(57) ABSTRACT

The invention relates to a device, in particular a power bank (20), comprising:
at least one port (24) for connecting the device to a terminal (10);
at least one memory (22) for storing useful data;
at least one rechargeable battery (26) for supplying a charging current to the terminal;
at least one computer unit (21);
wherein the computer unit (21) is configured, in particular programmed,
a) to send an authentication request (Req1) to the terminal (10); and
(Continued)

b) to receive a response (Res1) to the authentication request (Req1), wherein the charging current is interrupted within a charging interval (L1, L2, L3) or the charging interval (L1, L2, L3) is not initialized if successful authentication is not carried out by means of the authentication request and response.

17 Claims, 3 Drawing Sheets

(52) U.S. Cl.
CPC ....... *H02J 7/00034* (2020.01); *H02J 7/00045* (2020.01)

(58) Field of Classification Search
USPC .......................................... 320/103, 106, 115
See application file for complete search history.

(56) References Cited

U.S. PATENT DOCUMENTS

| | | | |
|---|---|---|---|
| 8,541,985 B1* | 9/2013 | Wong | H04M 1/72409 320/140 |
| 8,819,301 B2* | 8/2014 | Lai | H02J 7/00036 710/10 |
| 2005/0174094 A1 | 8/2005 | Purdy et al. | |
| 2009/0001932 A1 | 1/2009 | Kamijo et al. | |
| 2010/0146308 A1 | 6/2010 | Gioscia et al. | |
| 2010/0268411 A1 | 10/2010 | Taguchi | |
| 2012/0047368 A1 | 2/2012 | Chinn et al. | |
| 2012/0268238 A1* | 10/2012 | Park | H02J 7/00036 340/5.8 |
| 2015/0011160 A1 | 1/2015 | Jurgovan et al. | |
| 2016/0268801 A1 | 9/2016 | Chong et al. | |

FOREIGN PATENT DOCUMENTS

| | | |
|---|---|---|
| DE | 10 2015 101 562 A1 | 8/2015 |
| DE | 10 2014 117 180 B3 | 5/2016 |
| DE | 10 2015 008 191 A1 | 6/2016 |
| DE | 10 2016 112 911 A1 | 1/2017 |
| EP | 1 213 818 A1 | 6/2002 |
| JP | H11-150809 A | 6/1999 |
| JP | 2003-288539 A | 10/2003 |
| JP | 2006-114423 A | 4/2006 |
| JP | 2010-273419 A | 12/2010 |
| JP | 2013-069691 A | 4/2013 |
| JP | 2014-527689 A | 10/2014 |
| JP | 2014-529117 A | 10/2014 |
| JP | 2014-529392 A | 11/2014 |
| JP | 2014-531699 A | 11/2014 |
| JP | 2014-533480 A | 12/2014 |
| JP | 2015-050819 A | 3/2015 |
| JP | 2016-082872 A | 5/2016 |
| JP | 2016-517257 A | 6/2016 |
| JP | 2016-131021 A | 7/2016 |
| JP | 2017-502453 A | 1/2017 |
| WO | WO-2013/057584 A2 | 4/2013 |
| WO | WO-2016/101896 A1 | 6/2016 |

OTHER PUBLICATIONS

International Search Report and Written Opinion for Application No. PCT/EP2018/052633, dated May 18, 2018.

Office Action for German Application No. 10 2017 102 353.4, dated Jan. 25, 2018.

Notice of Reasons for Rejection for Japanese Application No. 2019-543773, dated Sep. 8, 2020.

\* cited by examiner

DEVICE AND METHOD FOR CHARGING A TERMINAL DEVICE

The invention relates to a device and a method for charging a terminal.

The use of mobile terminals, in particular smartphones and tablets, has increased dramatically in recent years. Such devices can be used not only for making telephone calls, but also for surfing the Internet. The computer units used in the mobile terminals are so powerful that even highly complex applications can be run by means of the mobile terminals.

One problem when using such terminals is that the power of the integrated rechargeable batteries is limited.

In order to charge terminals, it is known to connect these to a power outlet via a charger. Mobile charging is also known, in which so-called power banks—devices comprising powerful rechargeable batteries—are connected to the mobile terminals in order to charge the latter. One fundamental problem with such power banks is that they have to be carried along in order to enable a discharged terminal to be charged at any time. This is on the one hand not efficient and requires the purchase of multiple power banks so that a discharged power bank can be charged while another one is being carried as a backup.

Deutsche Telekom has therefore started to rent out power banks to customers in stores. Rental takes place only if a deposit is left in respect of the power bank in question. Customers can exchange an empty power bank for a full one in various stores.

Providing such "public" power banks requires a lot of effort.

Proceeding from this prior art, the problem addressed by the present invention is that of providing a device for charging a terminal, which can be used efficiently.

In particular, the aim is to enable such a device to be made available to the public without there being any need for human interaction with the user.

The problem is solved according to the invention by an (external) device which comprises:
- at least one port for connecting the device to a terminal;
- at least one memory for storing useful data;
- at least one rechargeable battery for supplying a charging current to the terminal;
- at least one computer unit;

wherein the computer unit is configured, in particular programmed,
a) to send an authentication request to the terminal; and
b) to receive a response to the authentication request, wherein the charging current is interrupted within a charging interval or the charging interval is not initialized if successful authentication is not carried out by means of the authentication request and response.

A core concept of the present invention is therefore that of providing a device, in particular a power bank, which for its part carries out an authorization of the user or of the terminal being used and provides a charging current on the basis of said authorization. The authorization is carried out by means of an authentication process, in which either the terminal itself and/or the user is authenticated.

To enable the charging current, use may be made of known access control mechanisms. For example, the device may transmit an identification number to the terminal, wherein the terminal requests from a central server a digital access key, which may only be valid for a limited time. This requested access code may be sent back to the device comprising the rechargeable battery as a response to the authentication request. In this embodiment, the device may comprise a clock which is synchronized with the server. In theory, numerous online methods for authentication and/or authorization are conceivable. According to the invention, preference is given to a method which can also be carried out offline.

In one embodiment, the device has a port which is suitable for connection to a USB bus or a USB cable. In one embodiment, the port is a serial bus port.

Serial bus ports are meanwhile widely used so that a high degree of device compatibility can be achieved. In addition, serial bus ports, in particular USB ports, can be used on the one hand to exchange data and on the other hand to supply power to the terminal.

In one embodiment, the computer unit is configured to change back and forth between a charging interval and a data transfer interval. In the charging interval, a charging current is delivered to the connected terminal via the bus. In the data transfer interval, data are exchanged between the memory of the device and the terminal via the bus. In one embodiment, the access to the memory of the device by the terminal is a read access.

The invention thus makes it possible to use the existing wired connection between the device and the terminal for charging and also for data exchange. In this regard, it should be noted that a classification of the connection takes place at the time of connection, for example when connecting a conventional USB cable. The device connected to the terminal is thus classified either as a slave or as a charging source. Simultaneous charging of the master—the terminal in the example—and communication with the slave is not provided in many protocols.

The present invention solves this problem in that numerous changeovers between charging intervals and data transfer intervals are carried out. Depending on the selected changeover rate, a situation may be achieved in which the end user is given the impression that charging and reading or writing are taking place simultaneously.

The device can thus be used not only as a power bank but also simultaneously as a data memory for providing relevant information. In one embodiment, the memory contains product information which can be seen by the authorized user.

In one embodiment, at least one charging interval, preferably most charging intervals (more than 90%), has a maximum length of less than 1 second. The maximum length of a data transfer interval can be selected at will according to the invention. In one embodiment, the maximum length of at least one data transfer interval is less than 5 seconds. It is possible to make the charging intervals and data transfer intervals correspondingly shorter, for example with a maximum length of less than 3 or less than 2 or less than 1 second. Short intervals have the advantage that the end user and the application using the data connection are barely impacted by the changeover. In other words, the impression is given that charging and communication are taking place quasi-simultaneously.

In one embodiment, over a period of 1 minute, the sum of the charging intervals is greater than the sum of the data transfer intervals. For example, the sum of the charging intervals may be 10 or 20 or 30% greater than the sum of the data transfer intervals. Modern data connections have such a high data transfer rate that a very high data throughput can be achieved even if the cable connection is used relatively briefly for data transfer.

In one embodiment, the device, for example the power bank, comprises a switch for interrupting a data transfer interval and/or a data connection. The switch may be configured as a relay and/or transistor. In theory, the switch may comprise a plurality of relays and/or transistors. According to the invention, the changeover between a data transfer interval and a charging interval may be initialized in that an existing physical connection is either interrupted or short-circuited. According to the invention, the switch can be used for this. After the interruption or the short circuit, the relationship between the devices, that is to say between the external device comprising the rechargeable battery and the terminal, is usually renegotiated. If the device according to the invention assumes a different status after the connection has been interrupted or short-circuited, the terminal will classify the external device differently. In this regard, it is possible to change between a classification as a slave and a classification as a charger, without any intervention having to be made in the driver software of the terminal. By virtue of this method, it is possible to change not only from a data transfer interval to a charging interval but also from a charging interval to a data transfer interval. In the USB standard, the external device may signal that it would like to serve as a charger by connecting the data lines D+ and D− through a resistance of less than 300 Ohm, in particular less than 200 Ohm. In one simple embodiment, the two data lines D+ and D− can simply be short-circuited. In this case, the terminal will assume that the connected external device is a charger. If, after the connection to the terminal has been interrupted, the external device removes the short-circuit connection or the resistance, no such classification as a charger will take place. The external device can then assume the role of a slave and provide data. According to the invention, the computer unit may be configured to operate said switch accordingly so that the changeover between the data transfer interval and the charging interval functions without any problem.

In one embodiment, the rechargeable battery in the external device is a lithium polymer battery or a lithium-ion battery. This may have a capacity of at least 1000 mAh, preferably at least 2000 mAh. In one embodiment, the rechargeable battery has a capacity of at least 4000 mAh.

The at least one memory of the external device may be a semi-permanent memory, for example a flash memory. The memory may have a capacity of at least 500 MB, preferably at least 1 GB.

The bus may be a two-wire bus, a four-wire bus or a six-wire bus. The charging interval may be defined such that, during the charging interval, a charging current of greater than 200 mA, in particular greater than 300 mA, in particular greater than 400 mA, flows from the external device to the terminal.

The computer unit may be configured to carry out the authentication repeatedly, in particular at least once per minute and/or once per charging interval. The repeated authentication ensures that the external device is not being used by an unauthorized terminal or user. In addition, the authorization to use the external device, in particular as a power bank, can be negotiated depending on the situation. For example, an item of software installed on the terminal and responding to the authentication request may decide whether to send a corresponding response depending on the situation. When making this decision, it may be taken into consideration whether the user of the terminal has identified himself, whether a particular application is being run on the terminal and/or whether certain information is being displayed on the terminal in a manner visible to the user. By way of example, the information may be product information which is stored in the memory of the external device. Using the described approach, it is also possible to implement other restrictions with regard to using the external device as a power bank. By way of example, it may be checked whether the terminal is located in a predefined geographic region, for example a department store. The computer unit may be configured to output the charging current only when this condition is met. Stealing of the external device can thus effectively be prevented.

The problem mentioned in the introduction is also solved by a system which comprises the (external) device comprising the rechargeable battery, as has already been described, and a terminal containing an application. The application or item of software is preferably configured to respond to the authentication request from the external device. The (external) device of the system may have some or all of the features already described.

In this connection, advantages similar to those already explained are obtained.

The application or item of software of the terminal may be configured to respond to the authentication request only when predefined requirements or conditions are met. Some of these requirements have already been explained. The requirement may be, for example, that particular data or useful data are being displayed on the display of the terminal. The application on the terminal may be configured to detect this requirement or situation. The requirement may also be a requirement that the terminal is located within a particular geographic region or that the power being used (the receiving of a charging current) has been paid for accordingly.

In one embodiment, the data or useful data are downloaded from the memory of the external device.

The problem mentioned in the introduction is also solved by a method for charging a terminal, which comprises the following steps:

receiving an authentication request, preferably in a wired manner, from a connected (external) device, checking whether data to be displayed are visible on a display of the terminal;

processing the authentication request;

sending a response to the authentication request only when the data are visible on the display;

changing over to a charging interval for charging the terminal.

Here, too, advantages are obtained which correspond to those already described in connection with the device and in connection with the system.

The method may implement repeated changeovers between a/the charging interval and a data transfer interval.

The problem mentioned in the introduction is also solved by a computer-readable storage medium containing instructions which cause at least one computer unit to implement the described method.

Further advantageous embodiments will emerge from the dependent claims.

The invention will be described below on the basis of exemplary embodiments, which are explained in greater detail by means of drawings.

IN THE DRAWINGS

Figure 1:
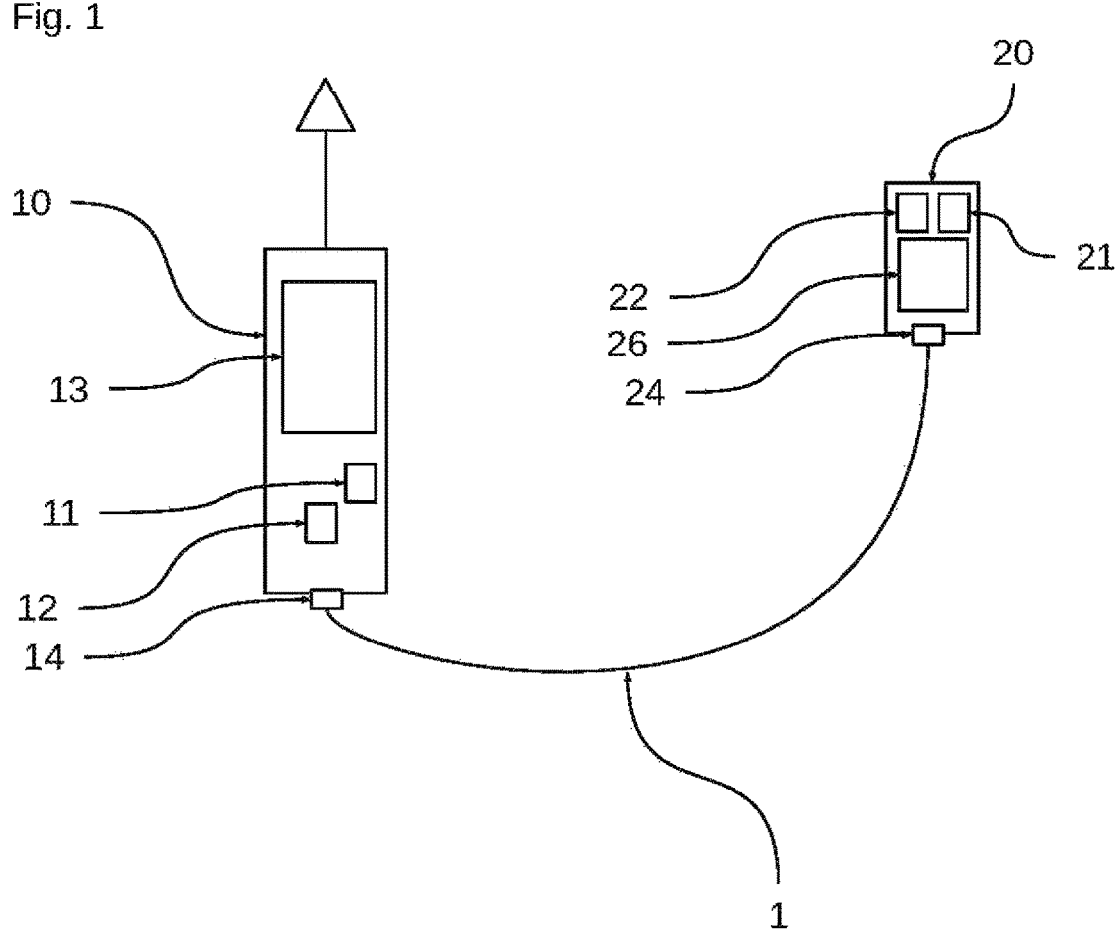
FIG. 1 shows a schematic diagram of a mobile terminal which is connected to a power bank.

According to FIG. 1, a terminal 10 according to the invention is connected to a power bank 20 according to the invention via a USB cable 1. For the connection, the mobile terminal 10 has a terminal USB port 14 and the power bank has a power bank USB port 24. The connection is therefore a wired plug-in connection, for which the conventional USB plugs can be used.

The mobile terminal comprises a terminal computer unit, a terminal memory 12 and a terminal display 13.

The power bank 20 likewise has a computer unit, namely the power bank computer unit 21. A power bank memory 22 and a power bank battery 26 are also provided.

Figure 2:
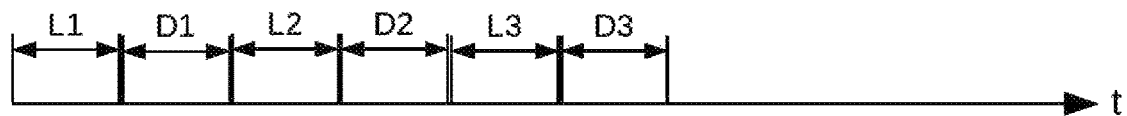
FIG. 2 shows a chronological changeover between charging intervals and data transfer intervals.

The power bank computer unit 21 runs an application which makes it possible to provide power for the terminal 10 in a charging interval L1, L2, L3 and to provide data for the mobile terminal 10 in a data transfer interval D1, D2, D3. In one exemplary embodiment according to the invention, changeovers take place between the charging intervals L1, L2, L3 and the data transfer intervals D1, D2, D3, as shown by way of example in FIG. 2.

Figure 3:
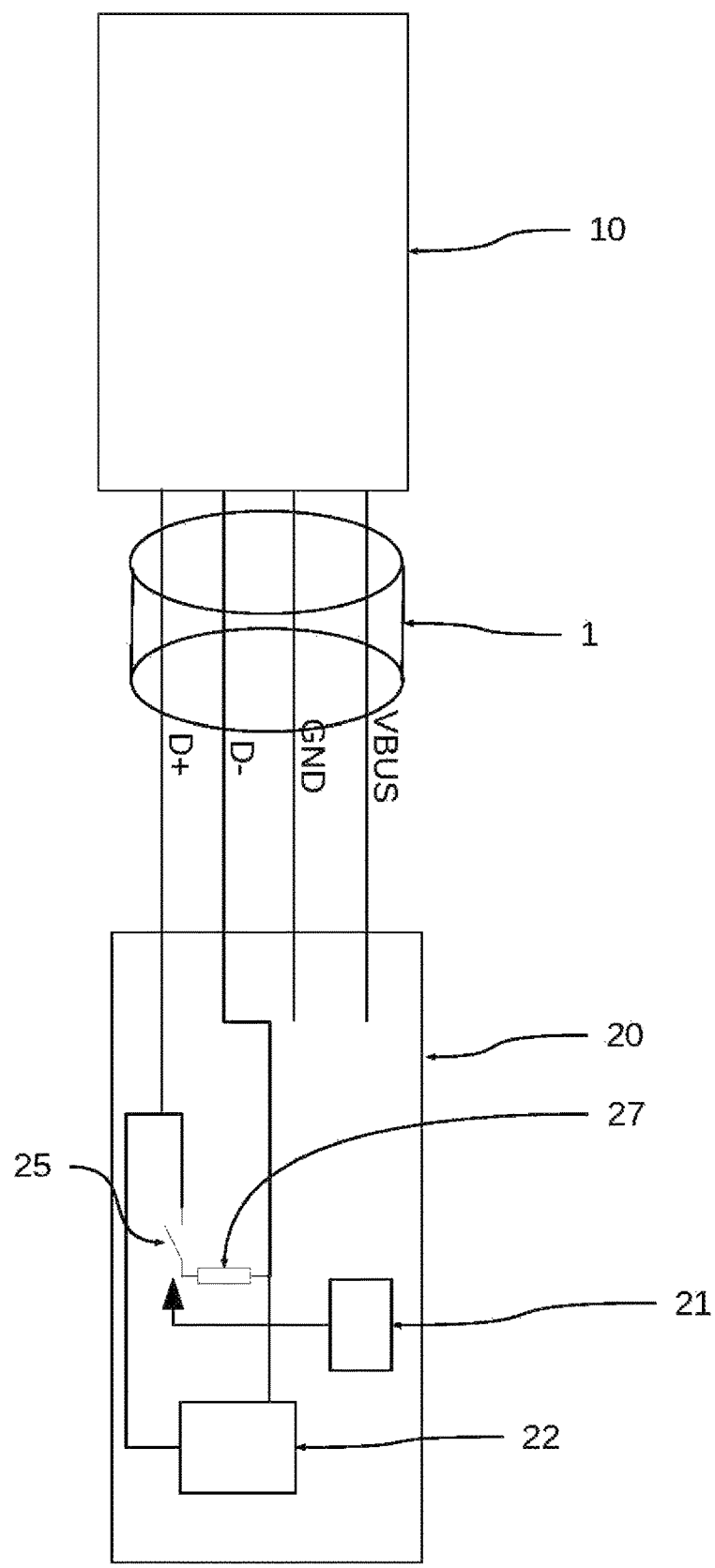
FIG. 3 shows a schematic detail view of the power bank of FIG. 1.

FIG. 3 shows by way of example how a changeover between a charging interval L1, L2, L3 and a data transfer interval D1, D2 and D3 can be implemented.

The figure shows the mobile terminal and the power bank 20, which are connected via the cable 1. The cable 1 comprises four wires/lines:
VBUS
GND
D−
D+

The data lines D+, D− are connected to the memory 22 of the power bank 20. It is thus possible to exchange data between the power bank 20 and the mobile terminal 10 via the data lines. The power bank 20 also has a resistor 27, which establishes a low-resistance connection between the data lines D− and D+ when the switch 25 is closed. By generating this "short circuit", it is possible to signal to the terminal 10 that the power bank 20 is a device which is suitable for providing a charging current. When there is no such low-resistance connection between the data lines D− and D+, the power bank can be classified as a slave, so that it is possible to read and write data from and to the power bank memory 22.

Figure 4:
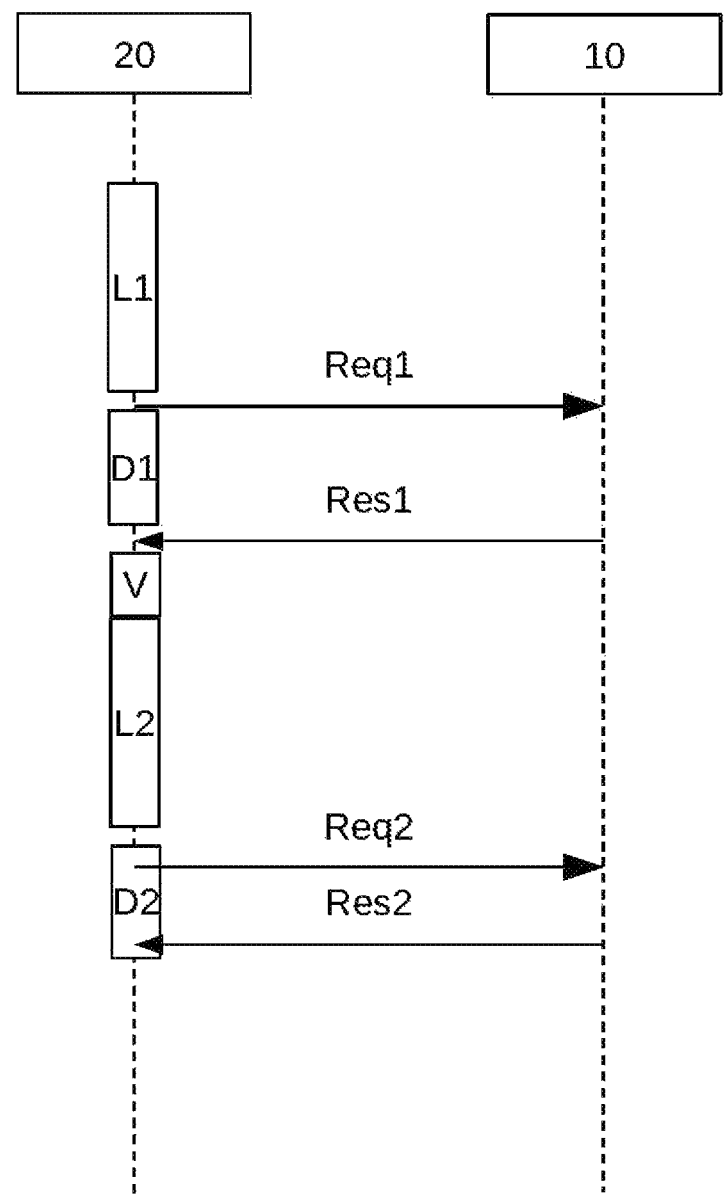
FIG. 4 shows an activity diagram of the interaction between the power bank and the terminal according to FIG. 1.

FIG. 4 shows an activity diagram which explains the invention in greater detail. Once the USB cable 1 has been connected, first (without authentication) a first charging phase can be implemented by the power bank computer unit 21 in the charging interval L1. In this charging interval L1, the "short circuit" described with reference to FIG. 3 exists. The connected mobile terminal can draw power from the power bank battery 26 (cf. FIG. 1). After a predefined period of time, for example 5 seconds, the power bank computer unit 21 interrupts the connection to the mobile terminal 10 so that a data connection is established for exchanging data. Data exchange interval D1 begins. At the same time, the power bank computer unit 21 sends an authentication request Req1 to the mobile terminal 10 and waits to receive a response Res1. As soon as the response Res1 has been received, the power bank computer unit 21 carries out a verification process and ascertains whether the response Res1 is the correct response to the authentication Request Req1 that was sent. If this is the case, a change back to a charging mode takes place once the data transfer interval L1 has elapsed. Charging interval L2 begins. To initialize the charging interval L2, it may be necessary that first the connection to the mobile terminal is physically interrupted. Thereafter, the data cables D+ and D− are connected by means of the switch 25 and the resistor 27. Once the charging interval L2 has elapsed, a change back to a data transfer interval D2 can take place. Simultaneously or with a time offset, a reauthentication may take place by means of a further authentication request Req2. The response Res2 to the request is again verified and a change back to a charging interval, for example L2, is permitted only if the verification V is successful.

According to the invention, it is not mandatory for an authentication to precede each charging interval L1, L2, L3. The authentication may take place at random or regularly at longer time intervals.

It is also not mandatory for a resistor 27 to be connected between the data lines D− and D+. In one exemplary embodiment according to the invention, the lines are simply short-circuited.

The described cutting of the connection may take place in that a further switch is provided for interrupting the line VBUS or GND. In theory, also all the lines shown in FIG. 3 can be interrupted. Optionally, it is also possible to omit a physical interruption when changing between a data interval and a charging interval, since the generation of the "short circuit" is already sufficient to force a reinitialization of the connection.

A person skilled in the relevant art knows numerous ways in which the present invention can be modified in order to achieve the predefined aims.

LIST OF REFERENCE SIGNS

1 USB cable
10 mobile terminal
11 terminal computer unit
12 terminal memory
13 terminal display
14 terminal USB port
20 power bank
21 power bank computer unit
22 power bank memory
24 power bank USB port
25 switch
26 power bank battery
27 resistor
L1, L2, L3 charging interval
D1, D2, D3 data transfer interval
V verification
Req1, Req2 authentication request
Res1, Res2 response to authentication request

The invention claimed is:

1. A device, comprising:
   at least one port for connecting the device to a terminal;
   at least one memory for storing useful data;
   at least one rechargeable battery for supplying a charging current to the terminal;
   at least one computer unit;
   characterized in that the computer unit is configured
   a) to send an authentication request to the terminal; and
   b) to receive a response to the authentication request, wherein the charging current is interrupted within a charging interval or the charging interval is not initialized if successful authentication is not carried out by means of the authentication request and response,
   wherein the computer unit is configured alternately to deliver the charging current to the connected terminal via the bus in charging intervals and to exchange useful data between the memory and the terminal via the bus in data transfer intervals.

2. Device according to claim 1, characterized in that the port comprises a serial bus port.

3. Device according to claim 1, characterized in that at least one charging interval and/or data transfer interval has a maximum length of less than 5 seconds.

4. Device according to claim 1, characterized in that over a period of 1 minute, the sum of the charging intervals is greater than the sum of the data transfer intervals.

5. Device according to claim 4, characterized in that over a period of 1 minute, the sum of the charging intervals is greater than at least 10% of the sum of the data transfer intervals.

6. Device according to claim 4, characterized in that over a period of 1 minute, the sum of the charging intervals is greater than at least 30% of the sum of the data transfer intervals.

7. Device according to claim 1, characterized by:
at least one switch for interrupting a data transfer interval and/or a data connection.

8. Device according to claim 1, characterized in that the at least one rechargeable battery is a lithium polymer battery or a lithium-ion battery and/or has a capacity of at least 1000 mAh.

9. Device according to claim 1, characterized in that the at least one memory comprises a semi-permanent memory and/or has a capacity of at least 500 MB.

10. Device according to claim 1, characterized in that the bus is a two-wire bus or a six-wire bus and/or the charging current in the charging interval is greater than 400 mA.

11. Device according to claim 1, characterized in that the computer unit is configured to carry out the authentication repeatedly.

12. Device according to claim 11 wherein the computer unit is configured to carry out the authentication at least once per minute or once per charging interval.

13. System, comprising:
a device having:
at least one port for connecting the device to a terminal;
at least one memory for storing useful data;
at least one rechargeable battery for supplying a charging current to the terminal;
at least one computer unit;
characterized in that the computer unit is configured
a) to send an authentication request to the terminal; and
b) to receive a response to the authentication request, wherein the charging current is interrupted within a charging interval or the charging interval is not initialized if successful authentication is not carried out by means of the authentication request and response; and
c) alternately to deliver the charging current to the connected terminal via the bus in charging intervals and to exchange useful data between the memory and the terminal via the bus in data transfer intervals; and
wherein the terminal includes an application which is configured to respond to the authentication request.

14. System according to claim 13, characterized in that the application is configured to respond to the authentication request only when predefined requirements including the displaying of useful data output by the application.

15. System according to claim 14, characterized in that the application is configured to download the data to be output at least partially from the device.

16. Method for charging a terminal, comprising the steps:
receiving an authentication request from a connected device;
checking whether the data to be displayed are visible on a display of the terminal;
processing the authentication request;
sending a response to the authentication request only when the data are visible on the display;
changing over to a charging interval for charging the terminal;
wherein repeated changeovers take place between the charging interval and a data transfer interval.

17. Computer-readable storage medium containing instructions which cause at least one computer unit to implement a method according to claim 16 when the instructions are executed by the computer unit.

* * * * *